No. 833,356. PATENTED OCT. 16, 1906.
H. WAIBEL.
CLEANSING AND COATING APPARATUS OF AND FOR THE INTERIOR OF CASKS.
APPLICATION FILED MAR. 5, 1906.

3 SHEETS—SHEET 1.

WITNESSES

INVENTOR
Henry Waibel
BY B. F. Eibler
Atty

No. 833,356. PATENTED OCT. 16, 1906.
H. WAIBEL.
CLEANSING AND COATING APPARATUS OF AND FOR THE INTERIOR OF CASKS.
APPLICATION FILED MAR. 5, 1906.

3 SHEETS—SHEET 2.

WITNESSES

INVENTOR
Henry Waibel
BY B. F. Eibler
Atty

No. 833,356. PATENTED OCT. 16, 1906.
H. WAIBEL.
CLEANSING AND COATING APPARATUS OF AND FOR THE INTERIOR OF CASKS.
APPLICATION FILED MAR. 5, 1906.
3 SHEETS—SHEET 3.
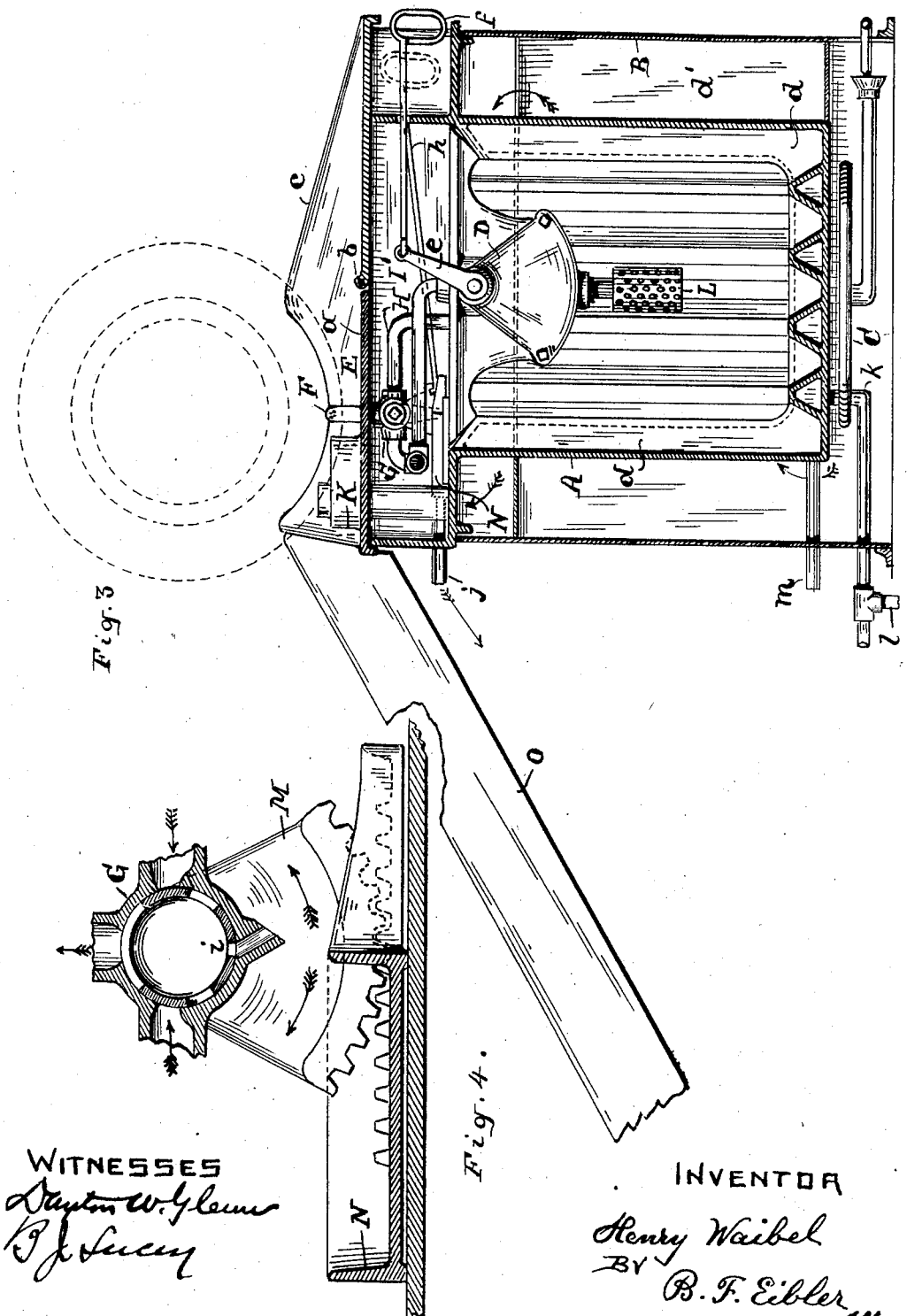

UNITED STATES PATENT OFFICE.

HENRY WAIBEL, OF CLEVELAND, OHIO.

CLEANSING AND COATING APPARATUS OF AND FOR THE INTERIOR OF CASKS.

No. 833,356.            Specification of Letters Patent.            Patented Oct. 16, 1906.

Application filed March 5, 1906. Serial No. 304,392.

*To all whom it may concern:*

Be it known that I, HENRY WAIBEL, of Cleveland, in the county of Cuyahoga and State of Ohio, have invented a new and useful Cleansing and Coating Apparatus of and for the Interior of Casks, of which the following is a specification.

My invention consists in an apparatus which in a most rational and expedient manner enables the treatment and preparation of the interior of casks for perishable liquids or beverages.

That the invention may be fully understood and seen, reference will be had to the following specification and the accompanying drawings, in which—

Figure 1:
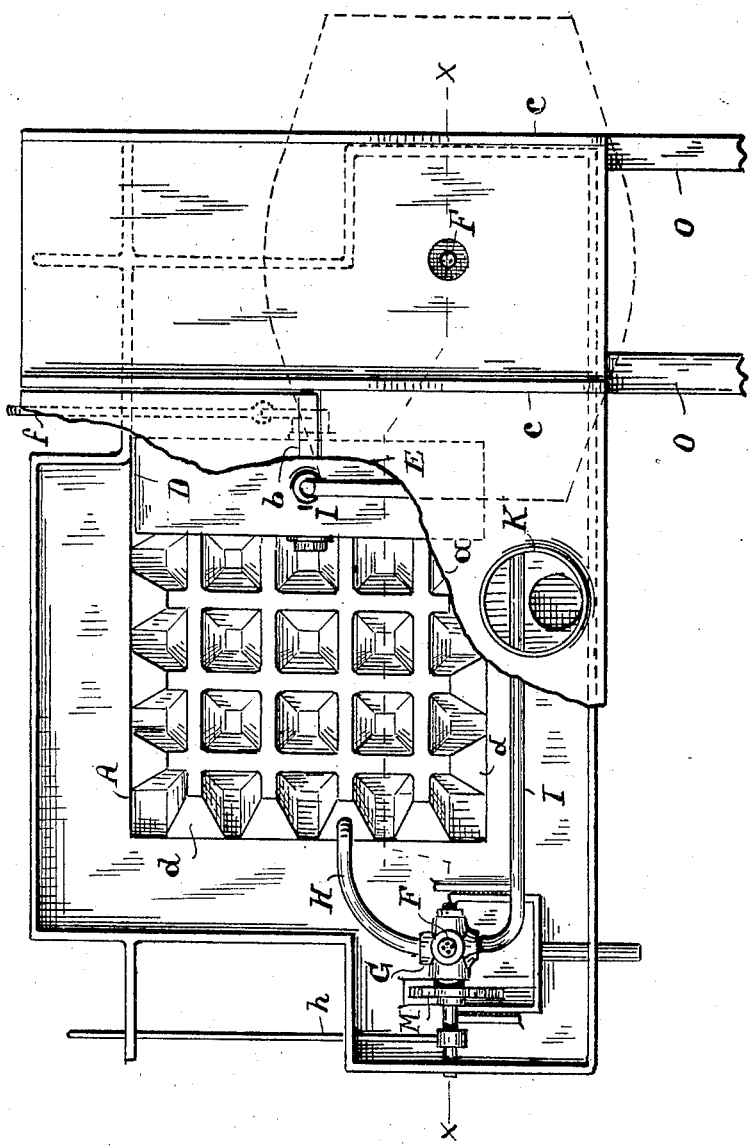
Figure 2:
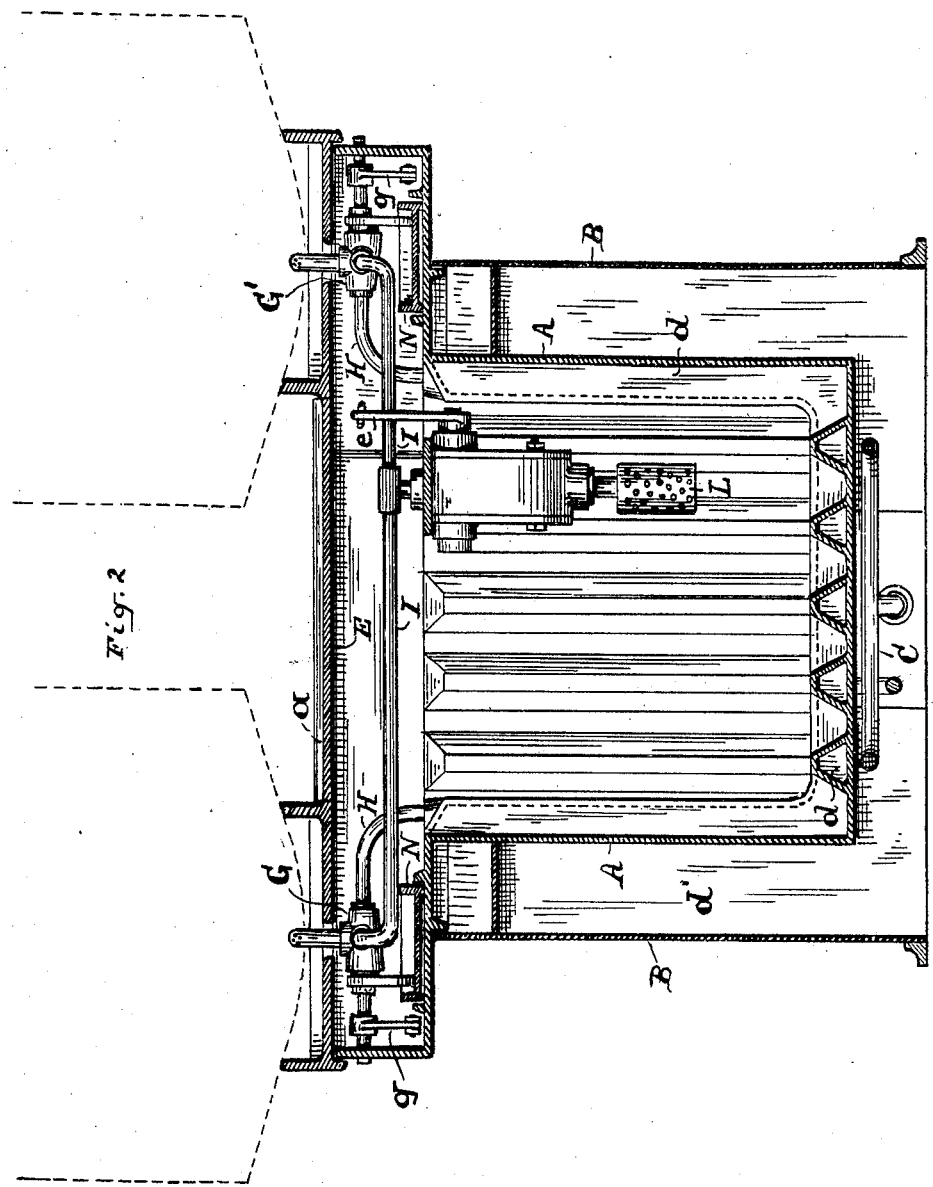

Figure 1 represents a plan view of said apparatus. Fig. 2 is a vertical sectional view of same on line $x\,x$. (See Fig. 1.) Fig. 3 is a transverse sectional view, (see Fig. 2;) and Fig. 4 illustrates, enlarged, a sectional view of detached parts thereof.

Like letters of reference denote like parts in the drawings and specification.

In the drawings, A designates the vessel part of the apparatus, and B a casing which surrounds said vessel distant therefrom. Below the vessel a suitable gas-burning contrivance C is applied. Suspended inside the vessel is a pump D. The upper portion of the vessel is flaring or recessed and covered by the lid E. Of the latter about half of the center portion $a$ is hinged, as at $b$, to enable ready access to the interior of the vessel for charging same, &c. Inclined and notched ridges $c\,c$ extend distant from and parallel with each other across the lid or cover E.

The notched or concaved portion of the ridges receives the casks when and while undergoing treatment, it being presupposed that the bung-hole of the cask appears directly over the protruding nozzles F F. Said nozzles have, preferably, a number of small perforations, so that the discharge therefrom is ejected in spray form into the casks. Three branch cocks G G' supply said nozzles with either steam or a sort of varnish, (hot resinous liquid, so-called "pitch.")

Both the steam and pitch are drawn from the vessel by way and means of the pipes H H I I' and the pump D. On the sides and bottom of the vessel are intercepting and connected tubular corrugations $d$, which serve the double purpose—namely, that of reinforcing the walls of the vessel and of holding or conveying steam. The walls of the vessel can therefore be very thin and yet furnish a strong structure, thin walls being essential to enable a quick heating (melting) of the pitch with which the vessel is charged in lump form.

As shown, there is a gas burner or burners applied at the bottom of the vessel. Another source of heat, however, may answer the purpose equally as well—namely, that of effecting and maintaining a temperature in the steam-charged channels which is efficient for melting the pitch in the vessel and for dissolving the pitch in the casks for cleansing.

The steam-charged channels in the vessel serve as a medium of equalizing the temperature over and in the vessel. Furthermore, they furnish a very large heating-surface. Thus pitch can be melted and heated very advantageously.

Steam from a boiler plant enters the channels at $k$, and if of sufficiently high temperature the source of heat under the bottom of the vessel may be dispensed with. Suitable outlets, as at $l$ and $m$, are provided for draining the contents from the channels and vessel. Furthermore, steam of low temperature or hot water may be run through the channels if the apparatus is used for cleansing of casks only, or water may be converted into steam solely by the heating appliance under the vessel.

In open relation with the combustion-chamber $d'$ and the entire surface beneath the cover is arranged the escape-flue K, carried off through which are the products of combustion from the burner and the vapors which arise from the vessel as well as the vapors given off when steam is applied for cleansing the casks, or said vapors from the steam may be carried off separately, since care must be taken that no condensation reaches the pitch.

Any suitable pump may be applied for forcing the pitch into the casks. As shown, pitch enters the pump by way of the strainer L and is discharged therefrom by way of pipe I'. By means of the lever $e$ the pump can be manipulated. A few out and inward strokes of the rod $f$ eject a sufficient quantity of pitch to cover the entire interior surface of the cask.

By means of the levers $g\,g$ and rods $h\,h$ the cocks G G' can be set so that either steam or pitch will issue therefrom. As shown, the levers appear in central position, in which instance both steam and pitch are shut off and simply the port *i* is left open to drain the nozzle.

By means of the segmental gear M M the catch-basins N N are simultaneously moved with the levers *g g*. A rack in the basins engages said gears.

When a cask is rolled or set over a nozzle, then the respective rod *h* is first pulled outwardly, whereupon steam is ejected from the nozzle. Also the catch-basin is moved forwardly to appear directly under the bung-hole to receive the drippings therefrom when and while the cask undergoes the cleansing operation. The basins are drained by means of the pipe *j*.

In pushing the rod inwardly from a central position pitch will be ejected from the nozzle, provided the pump is worked. Also the catch-basin is moved away from the bung-hole, so that the surplus pitch may be returned to the vessel. After pitching is done the treated cask is simply "kicked off" by the cask which is to undergo treatment. As shown, the casks can roll off on the stanchions O O. Thus casks can be cleansed and coated (pitched) with the least amount of manual labor. Also the apparatus consists of a very compact structure requiring a minimum amount of room.

Both for cleansing and coating (pitching) a cask requires but once to be handled, since either steam or pitch is ejected from out of one and the same nozzle. Furthermore, the vessel could be so equipped as to heat steam and pitch by electrical energy.

What I claim, and desire to secure by Letters Patent, is—

1. A cask cleansing and coating apparatus comprising a vessel with intercepting-channels which extend in and along the bottom and sides thereof, a source of heat maintaining steam in said channels at a temperature to melt pitch in the vessel and to dissolve defective pitch in the casks, cask-supports arranged in close proximity to said vessel, spray-nozzles projecting through said supports, means establishing interchangeable communication between said nozzles, the vessel and its channels and means effecting the ejection of pitch through said nozzles into the casks all arranged in a manner that the casks can be cleansed and pitched in one and the same position.

2. In a cask cleansing and coating apparatus the combination with its vessel of protruding intercepting-channels formed integrally with and along the bottom and sides of said vessel adapted to contain steam for the purpose of melting pitch in the casks and for heating the pitch in the vessel, a support for the casks and means to convey interchangeably steam and pitch into casks placed upon said supports substantially in the manner as set forth.

3. In a cask cleansing and coating apparatus the combination with the supports for the casks of spray-nozzles protruding through said supports and having interchangeable communication with a pump within the vessel and steam-supplying channels of said vessel, and means effecting a change in the communication of said nozzles while the casks remain in one and the same position to be freed of the defective pitch and lined with new pitch.

4. In a combined cleansing and coating apparatus for casks the combination of movable catch-basins adapted to collect the surplus charge of new pitch from the casks and returning same to the pitch-supply vessel, said basins being so arranged and connected as to move simultaneously sideward of the cask bung-hole when and while the casks are to be freed of their defective lining, so that the refuse can be conveyed away from the apparatus.

HENRY WAIBEL.

Witnesses:
  GUSTAV GOEHLERT,
  BERNHARD F. EIBLER.